Aug. 29, 1933.    J. SACHS    1,924,381
FLUSH VALVE ROD
Filed Jan. 30, 1933
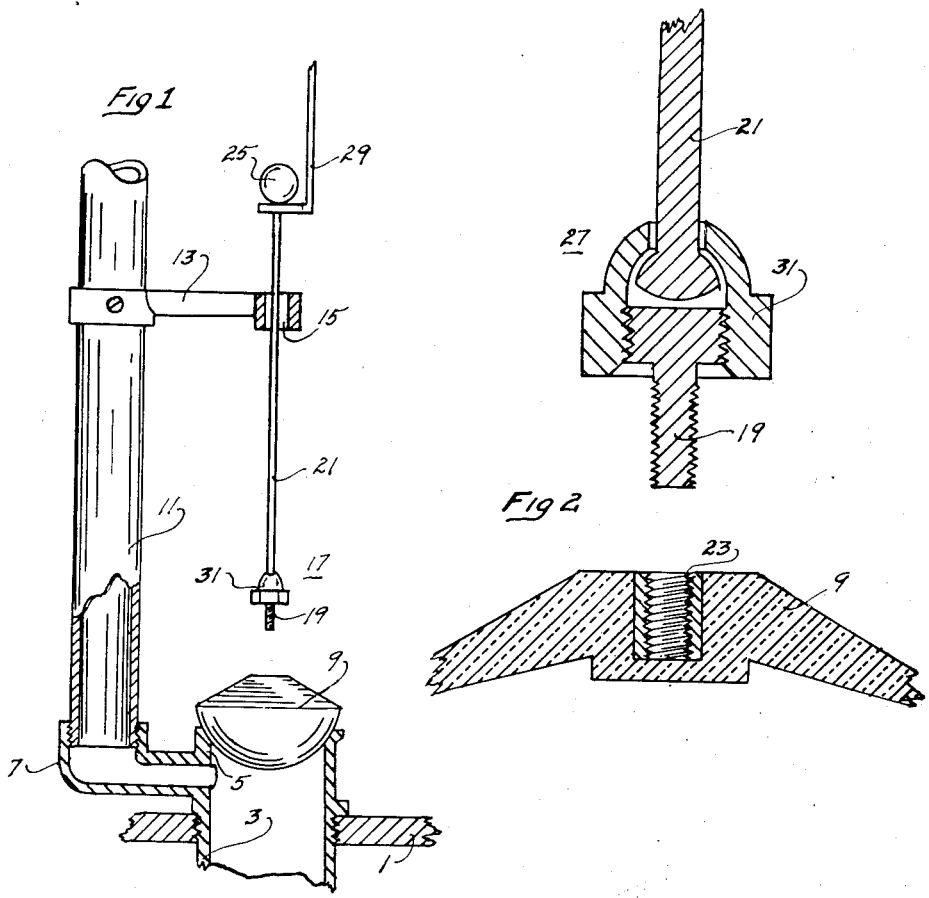
INVENTOR.
JOSEPH SACHS
BY
Edward Brosler
ATTORNEYS.

Patented Aug. 29, 1933

1,924,381

UNITED STATES PATENT OFFICE 1,924,381

FLUSH VALVE ROD

Joseph Sachs, Pittsburgh, Pa.

Application January 30, 1933. Serial No. 654,147

5 Claims. (Cl. 4—56)

My invention broadly relates to flush valves, more particularly to improvements in the valve rod thereof, whereby to obtain a more efficient construction and operation of the same.

It is an object of my invention to provide an improved valve rod for a flush type valve which shall permit universal and free movement of the float element with respect to the rod to assure perfect seating of the float under adverse conditions.

It is another object of my invention to provide an improved valve rod of the above type so constructed as to permit of the float being easily and readily assembled thereto by one, not necessarily skilled in the art, within the narrow confines of a tank of standard size.

Another object of my invention is to produce a valve rod having the above advantages, at a very reasonable cost.

Another object of my invention is to provide an improved valve rod capable of assuring correct seating of the float independently of the float construction.

Another object of my invention is to provide an improved valve rod of the above type adapted for use with any type of float construction.

It is a further object of my invention to provide a valve rod of linked construction wherein one portion thereof will have freedom of movement with respect to another portion.

Additional objects of my invention will be brought out in the following description of my invention.

The valve rod as employed at the present time in combination with a float comprises a length of stiff heavy wire looped at one end and usually threaded at the other end for engagement with the float. My invention broadly embodies the idea of providing in lieu of a stem of uniform stiffness throughout, a rod having one part capable of movement with respect to another portion thereof. A rod so constructed constitutes in itself a guide. For a more detail and complete description of my invention, reference is made to the accompanying drawing wherein Fig. 1 is a view illustrating the preferred form of my invention in combination with associated apparatus.

Fig. 2 is an enlarged view in section of the preferred form of my invention.

Referring now to the drawing, I have illustrated sufficient of the flushing apparatus to enable one skilled in the art to appreciate the advantages and operation of my invention. That portion which I have illustrated comprises the bottom wall (1) of the water tank through which extends a drain pipe (3) which terminates within the lower portion of the tank in two branch portions (5 and 7) of different diameters. The branch (5) having the larger diameter comprises the valve seat for the float valve (9) whereas the branch (7) having the smaller diameter supports an overflow pipe (11) in threaded engagement therewith. Mounted on this overflow pipe at some distance above the tank bottom is a laterally extending bar (13) having on opening (15) through its free end to receive the valve rod (17) of the float valve. This bar constitutes the guide bar whose function it is to guide the float toward the valve seat during a flushing operation. For reasons noted heretofore, the operation of the valve is apt to become very erratic.

To assure efficient and certain seating of the float (9) on the valve seat (5) I provide the valve rod or guide rod in two sections (19 and 21) and hinge one section to the other whereby it may have free movement with respect thereto. One end of the guide rod is threaded for engagement with the float (9) which is preferably of soft rubber having a threaded metallic insert (23) molded in the upper wall of the float which is reenforced or thickened for the purpose.

The other end of my improved guide rod is provided with a ball (25) removably threaded to the stem, the diameter of the ball being greater than that of the opening (15) through the guide bar (13). This ball, being removably threaded to the rod as it is, simplifies the assembling of the float valve without placing any restrictions on the size of the hinge or joint (27) at the point where the two sections of the guide rod are united. The ball further functions to provide a bearing surface far superior to the loop construction commonly used for the purpose. I have often found that where the looped construction is used, the loop very often hooks upon adjacent associated structure such as the lifting wire (29) which is normally looped around the rod, thereby throwing the operation of the valve out of gear. This can never happen with a rod terminating in a ball structure as described by me.

Generically speaking, any means for permitting relative movement between the two sections (19 and 21) of my guide rod (17) will result in a rod which will contribute to the valve as a whole the advantages which flow from my invention.

In the preferred embodiment of my invention, however, I provide a joint which will permit substantial movement in all directions. Referring to the drawing, I have illustrated a connection for this purpose. This may comprise a cap nut (31) or similar structure perforated at its apex to receive one end of one of the guide rod sections (21) which is enlarged to prevent its withdrawal therefrom. The other section (19) of the rod may then be threaded into the nut (31) or otherwise thereto. The opening through the apex of the cap nut should be of such size as to loosely receive the rod thus permitting leeway for relative movement between the two sections of the valve rod.

I do not limit my invention, however, to any specific location of the joint (27), in the rod structure. The joint constitutes a pivot point about which the float may swing with the lower rod section (19) and cap nut (31) constituting a moment arm. It should be apparent, therefore, that the higher up the rod the pivot point is located, the greater the moment arm and consequently, the greater the extent of movement of which the float (9) will be capable.

Thus, it will be apparent that the structure described by me will fulfill in an efficient manner the objects of my invention and while I have described my invention in the greatest detail, I do not desire to be limited thereto except as may be required by the prior art and the appended claims.

What I claim as my invention is:—

1. A valve guide comprising an element having a chamber therein substantially hemispherical in form with an extended cylindrical wall, said cylindrical wall being threaded, a channel through said element at the apex of said chamber, a rod having a diameter slightly less than the diameter of said channel and having an enlargement at one end, of dimensions sufficient to prevent passage of said enlargement through said channel, said rod being positioned in said channel with the enlargement positioned in said chamber, and another rod having one end in threaded engagement with said threaded cylindrical wall of said element.

2. A valve guide comprising an element having a chamber therein substantially hemispherical in form having an extended cylindrical wall, a rod having means at one end thereof for engaging said cylindrical wall to substantially close the entrance to said hemispherical chamber, a channel through the wall of said chamber at substantially the apex thereof, another rod loosely extending through said channel into said chamber, that portion of said last mentioned rod in said chamber having an enlargement thereon to prevent withdrawal of said rod from said chamber.

3. A valve guide comprising a coupling unit having an open chamber therein, a channel through said unit at substantially the mid-point of said chamber, a rod having a cross section slightly less than that of said channel and having an enlargement at one end thereof, said enlargement being of such size as to prevent the passage of said enlargement through said channel, said rod being positioned in said channel with the enlargement in said chamber, and another rod having one end affixed to said coupling and substantially closing the mouth of said open chamber, one of said rods being threaded for engagement with a valve float.

4. A valve guide comprising a coupling unit having a chamber therein, a channel through a wall of said chamber at substantially the midpoint thereof, said coupling unit including a rod affixed thereto at a point directly opposite to said channel, said rod being threaded for engagement with a valve, and another rod having an enlargement at one end thereof, said rod being loosely positioned in said channel with the enlargement in said chamber.

5. A valve guide comprising a coupling unit having a chamber therein, substantially hemispherical in form, a channel through a wall of said chamber at substantially the mid-point thereof, said coupling unit including a rod affixed thereto at a point directly opposite to said channel, and another rod having an enlargement with spherically curved surfaces at the end thereof, said rod being loosely positioned in said channel with the enlargement in said chamber, one of said rods being threaded for engagement with a valve float.

JOSEPH SACHS.